Dec. 16, 1958 J. A. POLACK ET AL 2,864,764
FLUIDIZED SOLIDS PROCESS FOR THE HYDROFORMING OF NAPHTHAS
Filed Sept. 21, 1954
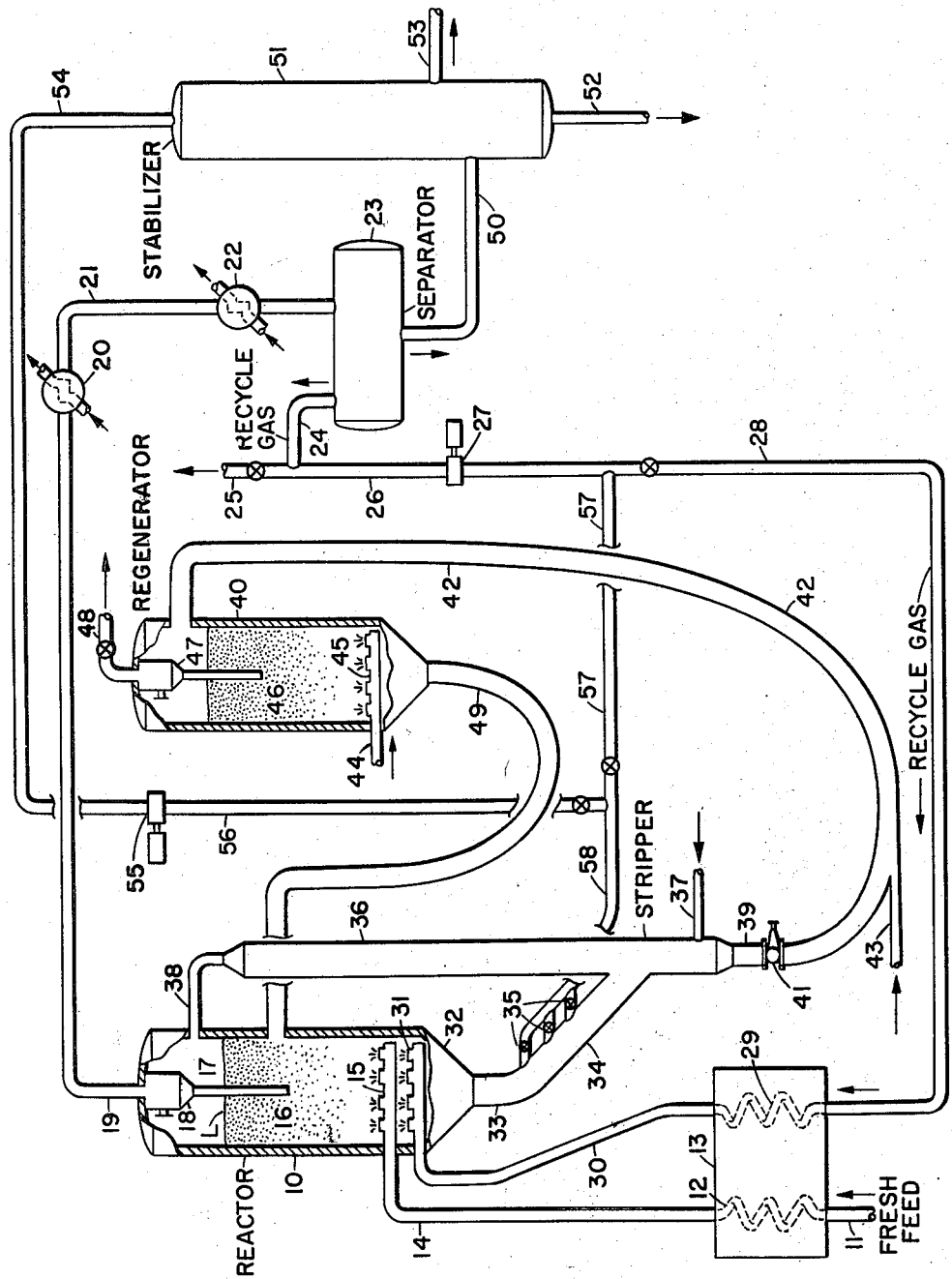
JOSEPH A POLACK
LAWRENCE E. SWABB, JR.   INVENTORS
GEORGE A. DANNER, JR.
BY
ATTORNEY

United States Patent Office 2,864,764
Patented Dec. 16, 1958

2,864,764

FLUIDIZED SOLIDS PROCESS FOR THE HYDROFORMING OF NAPHTHAS

Joseph A. Polack and Lawrence E. Swabb, Jr., Baton Rouge, La., and George A. Danner, Jr., Tuscola, Ill., assignors to Esso Research and Engineering Company, a corporation of Delaware Application September 21, 1954, Serial No. 457,322

7 Claims. (Cl. 208—149)

This invention relates to the catalytic conversion of hydrocarbons, and more particularly to the catalytic reforming or hydroforming of hydrocarbon fractions boiling in the motor fuel or naphtha range of low knock rating into high octane number motor fuels rich in aromatics by the fluidized solids technique.

It is known that petroleum naphthas can be subjected to a reforming treatment or hydroforming to yield liquid products boiling within the gasoline boiling range and possessing higher octane numbers and better engine cleanliness characteristics. It has been proposed to effect the hydroforming of naphtha fractions in a fluidized solids reactor system in which the naphtha vapors are passed continuously through a dense, fluidized bed of finely divided hydroforming catalyst particles in a reaction zone, spent catalyst being withdrawn continuously from the dense bed in the reaction zone and passed to a separate regeneration zone where inactivating carbonaceous deposits are removed by combustion, whereupon the regenerated catalyst particles are returned to the main reactor vessel or hydroforming reaction zone.

Difficulty has been encountered in achieving a heat balanced operation in fluid hydroforming. Because of selectivity considerations, low catalyst to oil ratios must be maintained in the hydroforming reaction zone, and this low catalyst to oil ratio limits the amount of heat that can be safely transferred from the regeneration zone to the reaction zone as sensible heat in the catalyst. Since the amount of heat released in the regenerator is so great that the catalyst is incapable of transferring it to the reaction zone at the low catalyst to oil ratios used, it is common practice to arrange cooling coils in the regenerator to remove heat over and above that which can be safely transferred to the reactor by the catalyst. It is, therefore, necessary to supplement the heat supplied to the reaction zone by the catalyst, and this is done by preheating the feed stock and the recycle or hydrogen-rich process gas to temperatures well above the average reactor temperature. This preheating has an adverse effect upon the yield of liquid products, since it brings about thermal degradation of the feed as well as the higher molecular weight constitutents of the recycle gas. Moreover, excessively large amounts of recycle gas must be introduced to carry heat into the reaction zone. The cost of installing and operating this extra compressor and heat exchange capacity adds very substantially to the total plant costs.

It has been proposed to overcome this heat transfer problem by circulating inert, heat transfer solids or shot between the reactor and regenerator for absorbing heat in the regenerator and carrying that heat into the reaction zone. It would be a relatively simple matter, of course, to add inert solids to the catalyst and circulate a homogeneous mixture between the reactor and the regenerator. However, this would not be practicable because the use of about 3 to 5 parts of heat transfer solids per part of catalyst would require a reduction in hydrocarbon feed rate to the reactor to one-fourth or less because valuable reactor space would be occupied by inert heat transfer solids rather than by catalyst.

It is the object of this invention to provide the art with an improved method and apparatus for the conversion of hydrocarbons by the fluidized solids technique.

It is also the object of this invention to provide the art with a fluidized solids reactor system in which inert heat transfer solids may be circulated between a reaction zone and a regeneration or heater zone in a novel and advantageous manner.

It is a further object of this invention to provide a fluidized solids reactor system in which inert heat transfer solids may be circulated between a reaction zone and a regeneration or heater zone at a rate which may be readily controlled to provide the desired heat input to the reaction zone and/or the desired heat removal from the regeneration zone.

It is also an object of this invention to provide a fluidized solids reactor system in which inert heat transfer solids are passed downwardly through a dense fluidized bed of catalyst in a reaction zone at a relatively rapid rate, whereupon a mixture of catalyst and inert heat exchange solids is withdrawn from the reactor for transfer to a regenerator or heater vessel.

It is the particular object of this invention to provide an improved method for attaining positive control of the ratio of shot or inert heat transfer solids to catalyst in the mixture of solids withdrawn from the reactor.

These and other objects will appear more clearly from the detailed specification and claims which follow.

In accordance with the present invention inert heat transfer solids or shot and catalyst are supplied to the reactor vessel and maintained therein as a dense fluidized bed by the passage of gaseous or vapourous materials therethrough. The inert heat transfer solids are ordinarily larger and of greater density than the catalyst particles, and under the vapor velocities maintained in the reactor vessel, the shot particles tend to settle through the reactor vessel more rapidly than the catalyst. By swaging down the lower part of the reactor or by arranging a settling vessel of smaller cross-sectional area at the bottom of reactor, the inert heat transfer solids or shot may be concentrated so that the ratio of shot to catalyst will be considerably greater than in the main fluid bed within the reaction zone. The shot concentration in the fluid solids leaving the bottom of the reactor or settling zone depends upon the shot flow rate into the reactor, the shot particle size, the shot density, properties of the catalyst bed, reactor bed aeration rate, and the ratio of the reactor area to the area of the reduced section or settling zone by physical laws of settling and diffusion that are familiar to those skilled in the art. The desirable ranges of these variables are as follows:

Shot flow rate—0.1–5.0 lbs./sec./ft.$^2$, preferably 0.3–1.0 lb./sec.ft.$^2$

Shot particle size—100–800 microns, preperably 300–500 microns

Shot particle density—100–300 lb./ft.$^3$, preferably 150–200 lb./ft.$^3$

Properties of catalyst bed—primarily "fluidity" which depends on type of catalyst material, particle size, and shape of catalyst particles. Catalysts of high "fluidity" most desirable such as normal hydroforming or cracking catalysts of about 0–100 microns with a major proportion between 20 and 80 microns and preferably of spherical or spheroidal shape Reactor bed aeration rate—0.3–2.0 ft./sec. preferably 0.5–1.0 ft./sec.

Ratio of reactor area to area of reduced section—range, 2 to 15; preferably 4 to 10

A further variable is the aeration pattern of the unit, although this is not as specific a variable as those above. It has been observed that poor gas distribution in a bed of catalyst through which shot is settling may lead to large shot holdups in the bed, channeling of shot through the bed, or dead areas of shot with consequent blocking of passageways. The most desirable condition or best aeration pattern is that which permits an even distribution of aeration gas across the area perpendicular to the shot flow through the catalyst bed. This can be obtained by a multiplicity of injection nozzles or similar devices arranged in an orderly and symmetrical fashion throughout the area. Local high gas velocities (greater than 50 ft./sec.) in zones of high shot concentration should be avoided.

In a given unit the shot concentration in the circulating solids is also a function of the shot inventory in the unit. High shot inventories will result in high shot concentration and vice versa. The shot inventory required for a given range of circulating shot concentrations, of course, depends upon the size of the unit under consideration. For example, in a hydroforming unit, operating under hydroforming conditions, a shot inventory of 10–30% of the total solids inventory would be required when circulating a mixture of 2–3 parts shot to one part catalyst between the reactor and regenerator.

In accordance with this invention it has been found that in a given unit, operating at given conditions, additional control of the shot concentration can be obtained by sloping the withdrawal line for the shot-catalyst mixture at an angle of from about 30° to 60° from the horizontal and providing aeration taps at spaced points on the circumference, preferably along the upper part of said line for injecting relatively high density gas, preferably a high molecular weight hydrocarbon gas. It is further proposed to utilize a gas stream withdrawn from the product stabilizer alone or in admixture with sufficient recycle gas or hydrogen-rich process gas to give the desired gas density. The gas velocity in the sloping conduit also has an effect on the change in shot concentration and can be used to some extent to control the circulating shot/catalyst ratio. For example, when contacting a shot catalyst stream having a total solids mass velocity through the conduit of 900–1000 lbs./min./ft.$^2$ with a recycle gas of a density of from 0.20–0.30 lb./C. F., the shot to catalyst ratio of the mixture leaving the conduit was substantially the same as that entering when the superficial velocity of the gas was low, i. e., 0.08 to 0.12 foot per second, but the ratio of shot to catalyst was increased by about 50% when the superficial velocity of the gas was relatively high or about 1.4 to about 1.8 feet per second.

Reference is made to the accompanying drawing illustrating diagrammatically a two-vessel reactor system in accordance with the present invention.

The particular embodiment illustrated is pointed particularly to the hydroforming of naphtha or motor fuel fractions. It will be understood, however, that this invention can also be utilized in other processes such as catalytic cracking, coking of residual petroleum fractions, and shale retorting, each of which may require some small or minor modifications for most effective utilization of this invention.

In the drawing, 10 is the main reactor vessel. Fresh hydrocarbon or naphtha feed is supplied through line 11, preheated in coil 12 in furnace 13, and the preheated charging stock is supplied through inlet line 14 and distributor ring or nozzles 15 in the lower part of the reaction vessel. The reactor vessel is charged with finely divided catalyst particles and inert heat transfer solids or shot which are maintained as a dense, fluidized, liquid simulating mass or bed 16 having a definite level L or interface separating the dense, fluidized bed 16 from a disperse or dilute phase 17 comprising small amounts of catalyst entrained in the vaporous reaction products which occupies the upper part of the reaction zone. The reaction products pass overhead from reactor vessel 10 through a cyclone separator 18 or the like in order to free them of most of the solid particles that are entrained therewith. The separated solid particles are returned to the reactor dense bed through the dip leg attached to the bottom of the cyclone separator 18. Reaction products substantially free of catalyst or other solid particles are removed through product outlet line 19 and passed through heat exchanger 20. Fresh feed or recycle gas is passed through heat exchanger 20 to absorb some of the heat in the reaction products stream. The partially cooled reaction products are then passed via line 21 through cooler or condenser 22 and thence into separator 23, where the liquid products are separated from normally gaseous reaction products.

Suitable catalysts for charging to the reactor vessel 10 are metal oxides such as molybdenum oxide, chromium oxide, tungsten oxide, vanadium oxide, or the like, or mixtures thereof, alone or preferably upon a support or carrier such as activated alumina, zinc aluminate spinel, or the like. Other known hydroforming catalysts such as platinum or palladium upon alumina can also be used. Cracking catalysts that may be used include silica-alumina cogels, silica-magnesia and acid activated clays. The catalyst particles should, for proper fluidization, be between about 200 to 400 mesh in size or about 10 to 200 microns in diameter with a major proportion between about 20 and 100 microns.

The inert heat transfer solids or shot are preferably coarser and/or of greater density than the catalyst used in the process. Suitable materials for use as inert heat transfer solids are corundum, mullite, fused alumina, fused silica, or the like. It is necessary that the heat transfer solids have no adverse effect upon the hydroforming process or other catalytic reaction and that they be stable or resistant to breakdown due to the thermal and physical forces to which they are subjected in the process. The size of the heat transfer solids may vary from about 100 to 800 microns and they are preferably 300 to 500 microns in diameter and also are preferably in the shape of spherical or spheroidal particles. The inert heat transfer solid particles are of as large a diameter as may be used and still obtain proper fluidization in the transfer lines as well as the several vessels in the system.

The catalyst and the inert heat transfer particles are introduced into the upper part of the reactor vessel 10, as will be described in detail below. The catalyst and inert heat transfer solids are maintained as a dense, fluidized, liquid simulating bed 16 by the passage therethrough of the vaporous reactants and diluent gases or vapors. The diluent gas is preferably normally gaseous reaction products which are withdrawn from separator 23 through line 24. Excess process gas or tail gas is vented from the reactor system through valve controlled discharge line 25. The main portion of the process or recycle gas is passed via line 26 through compressor 27 and line 28 to preheat coils 29 in furnace 13. The preheated recycle or process gas is passed via line 30 to distributor means 31 at the bottom of the reactor.

The heat exchange solid particles or shot being larger and preferably of greater density than the catalyst particles, tend to settle downwardly in the dense bed 16 in the reactor more rapidly than the catalyst particles, thereby establishing a concentration gradient of shot in the lower part of the reactor. In order to further concentrate the shot, the lower part of the reactor vessel is swaged down as at 32 to connect to a shot settling vessel or conduit 33. In accordance with the present invention, further concentration or control of the ratio of shot to catalyst withdrawn from the reactor is effected by sloping the withdrawal line 34 which is connected to the bottom of conduit 33 at an angle of from about 30° to about 60° from the horizontal. In this way the shot particles tend to settle out, forming a shot-rich mixture along the lower side of the sloping conduit 34 and forming a catalyst-rich mixture along the upper portion of conduit 34. Aeration taps 35 are arranged along the upper portion of conduit 34 for the introduction of a high density gas which serves to effect a further concentration of shot particles in the sloping conduit 34. Aerations taps 35 are shown along the upper portion of line 34 but they may also be located at any point on the circumference of line 34. The high density gas is preferably a high molecular weight hydrocarbon gas such as propane or butane or a mixture of gasses rich in propane and butanes. The preferred gas for aeration of the sloping conduit 34 is the gas taken overhead from the product stabilizer as will be described below. Further control of the concentration of shot particles may be achieved by control of the superficial velocity of the gas passing through the sloping conduit.

The shot-rich mixture of solids is discharged from the sloping conduit 34 into stripping vessel 36. Gas such as steam or recycle gas is introduced through line 37 at the bottom of stripping vessel 36 in order to effect the removal of entrained or absorbed hydrogen and hydrocarbons from the mixture of shot or inert heat transfer solids and catalyst. Gas is taken overhead from stripping vessel 36 and is passed via line 38 into the dilute phase in reactor vessel 10. Catalyst-shot mixture flows downwardly through the stripping vessel 36 into standpipe 39 wherein fluistatic pressure is built up sufficient to facilitate transfer of catalyst-shot mixture into the regenerator vessel 40. Catalyst-shot mixture is discharged from the base of standpipe 39 through a slide valve 41 or the like into a transfer line 42, where it is picked up by a stream of carrier gas such as air, flue gas, steam, or the like supplied through line 43 and carried into the regenerator vessel 40. Regeneration gas or air is supplied to the lower part of regenerator vessel 40 through inlet line 44 and distributor ring 45 or the like.

Air or regeneration gas is supplied to the bottom of regenerator vessel 40 through line 44 at a sufficient rate to maintain the shot-catalyst mixture as a dense, fluidized bed 46. In the event that there is insufficient carbonaceous material upon the shot and catalyst particles supplied to regenerator 40 to raise the temperature of the solids to the desired level, an extraneous liquid or gaseous fuel may be supplied to regenerator 40 or to the solid particles in transfer line 42 in order to heat the solid particles to the desired temperature.

Combustion gases are taken overhead from regenerator 40 through a cyclone separator 47 for removing solid particles therefrom and discharged through outlet line 48 to a waste gas stack or to suitable scrubbing and storage equipment in the event that it is desired to use this gas as a carrier, diluent, or stripping gas.

Heated shot or shot-catalyst mixture is discharged from the base of regenerator 40 into conduit 49 for transfer back to the reactor. The conduit 49 may comprise a U-bend, or it may comprise a standpipe and dilute phase riser to effect transfer of these solids back into reactor vessel 10. Slide valve or other flow control means may be arranged in conduit 49 in order to control the flow of solids from the regenerator 40 to the reactor 10.

As indicated above, aeration taps 35 are arranged along the sloping conduit 34 for the introduction of a high density gas which facilitates the separation of a high shot/catalyst ratio mixture for transfer to the stripper and thence to the regenerator vessel. A most convenient source of supply of this gas is the light ends taken overhead from the product stabilizer. The liquid hydroformate is withdrawn from separator 23 through line 50 and transferred to stabilizer 51, where it is subjected to fractionation. Polymer or heavy ends are removed through line 52 and the stabilized liquid product is removed through line 53 and passed to product blending or storage. Light ends consisting principally of butanes with small amounts of lower and higher molecular weight hydrocarbons are taken overhead from stabilizer 51 through 54 and are then passed through compressor 55 and line 56 for passage to aeration taps 35. In order to control the density of gas supplied to the aeration taps, a side stream of recycle gas is taken off recycle gas line 28 through line 57 for mixture with the stabilizer overhead gas. Control valves are arranged in lines 56 and 57 to regulate the proportions of each gas supplied and the mixture of the desired composition is passed through line 58 to the aeration taps 35, which are utilized to control the amount or superficial velocity of the gas through the sloping conduit. The gas supplied to the sloping conduit has a density above 0.20 lb./cu. ft., preferably between about 0.30 to 0.50 lb./cu. ft.

*Example 1*

The following is an example of typical conditions when operating a shot system for hydroforming in accordance with the present invention.

A virgin naphtha boiling within the range of 200°–350° F. and containing 30–40 volume percent naphthenes and having an octane number of 50 is treated in the presence of a fluidized bed of hydroforming catalyst consisting of 10 weight percent of molybdenum oxide and 90 weight percent alumina at 900° F. and under the pressure of 200 pounds per square inch, while charging 2500 cubic feet of recycle gas containing 55% $H_2$ per barrel of oil to the reaction zone. The catalyst has an average particle size of 60 microns. The reactor space velocity is 0.3 pound of oil per hour per pound of catalyst, the superficial linear velocity in the reaction zone is 0.4 foot per second, and the ratio of catalyst to oil fed to the reaction zone is 0.9 pound of catalyst per pound of oil. The preheat temperature of the oil is 940° F. and that of the recycle gas is 1000° F. The catalyst is regenerated at 1100° F. A mixture of shot and regenerated catalyst containing 4 pounds of shot per each pound of catalyst is fed to the reaction zone from the regeneration zone at 1100° F. The shot has an average particle size of 400 microns and has a density of 195 pounds per cubic foot. The shot and catalyst mixture leaves the reaction zone and enters the settling zone where the superficial gassiform linear velocity is 0.5 foot per second. The mixture then passes at a total solids rate of 1100 lbs./min./ft.$^2$ through a transfer line sloping 45° from the horizontal in which the superficial gasiform linear velocity opposite to the direction of solids flow is 1.0 foot per second. The ratio of pounds of shot to pounds of catalysts is in the reaction zone 0.2, in the settling zone 2.5 and issuing from the sloping transfer line 4.0. The density of the gas injected into the sloping transfer line is 0.35 pound per cubic foot and is made up of 37 percent stabilizer gas of a density of 0.67 pound per cubic foot and 63 percent recycle gas of a density of 0.19 pound per cubic foot at 900° F. and 200 pounds per square inch pressure. A hydroformate having a research octane number of 95 is obtained in 80% yield of liquid product.

It will be understood, of course, that the foregoing example is not to be construed as placing any limitation on the invention, for it is merely illustrative. Thus catalyst other than molybdenum oxide and alumina may be used, including metals such as platinum or palladium carried on alumina or other support. Also, metal oxide such as chromium oxide may be used as the active component for the hydroforming catalyst. The temperature in the reaction zone may vary from 875°–1050° F., the pressure may vary from 50–500 p. s. i., the recycle gas fed to the reaction zone may vary from 500–6000 cubic feet of 50–75% hydrogen per barrel of oil, and the catalyst to oil ratio may vary from 0.5 to 2.0 pounds of catalyst per pound of oil. The preheat temperature of the oil may vary from 600°–950° F., and the preheat temperature of the recycle gas may vary from 900°–1400°

F. It is also within the compass of this invention to hydroform a large variety of stocks, such as stocks containing ½% by weight of sulfur or more, stocks which contain substantial quantities of olefinic hydrocarbons, and stocks which contain as low as 15% naphthenes, the remainder being paraffinic hydrocarbons. The process of the present invention is particularly suitable for treating sulfur-containing stocks which cannot be handled efficiently using a noble metal catalyst, such as platinum, thus an important feature of the present invention is its capability of hydroforming naphthas, utilizing relatively low recycle gas rates such as set forth in the foregoing example, and at the same time merely heating the recycle gas to a temperature of around 1000° F., which avoids degradation of the hydrocarbons in the recycle oil and permits heating of the recycle gas and the feed oil in the unitary system in admixture with each other rather than having separate heating means for the oil and the recycle gas were it necessary to heat the recycle gas to temperatures of the order of, say, 1400° F., which heating is required in the absence of the use of hot shot.

*Example II*

The following data show, in particular, the effect of the fluidizing gas density on the shot/catalyst ratio as the mixture of solids passed at a rate of 1100 lbs./min./ft.² through a three-inch diameter line, about two feet long, and sloping 45° from the horizontal.

| Gas Composition | | Gas Temp., ° F. | Gas Density, Lb./C. F. | S/C Ratio Entering | S/C Ratio Leaving |
| --- | --- | --- | --- | --- | --- |
| Percent $H_2$ | Percent $N_2$ | | | | |
| 0 | 100 | 650 | 0.59 | 5.1 | 10.0 |
| 0 | 100 | 800 | 0.52 | 4.1 | 7.1 |
| 34 | 66 | 800 | 0.35 | 2.9 | 4.7 |
| 65 | 35 | 800 | 0.20 | 2.4 | 3.4 |

As can be seen from the tabulation, the fluidizing gas density was changed by changing the gas composition and the temperature of the system. In each case the superficial velocity of the gas through the sloping conduit was about 1.0 foot per second.

The feed or charging stock to the reactor in a hydroforming operation may be a virgin naphtha, a cracked naphtha, a Fischer-Tropsch naphtha, or the like, having a boiling range of from about 125°–450° F., or it may be a narrow boiling cut from within this range. The feed stock is preheated alone or in admixture with recycle gas to reaction temperature or to the maximum temperature possible while avoiding thermal degradation of the feed stock. Ordinarily, preheating of the feed stock is carried out at about 600°–950° F., preferably about 900° F. Hydrogen-rich gas or recycle process gas which contains 50 volume percent or more of hydrogen is preheated to temperatures of about 900°–1400° F. in suitable preheat coils. Recycle gas is circulated through the reaction zone at a rate of from about 500 to 6000 cubic feet per barrel of naphtha feed.

The hydroforming reactor vessel is operated at about 850°–1050° F., and at pressures of about 50–500 pounds per square inch, preferably about 200 pounds per square inch. In the case of molybdenum oxide on alumina catalysts, it is desirable to maintain a small water partial pressure (approximately 0.1 to about 3.0 mol percent) in the reaction zone. This water partial pressure can be obtained from water in the feed and/or in the recycle gas and also due to the formation of water in the regeneration as well as the pretreatment or partial reduction of the regenerated catalyst. This small water partial pressure permits operation at somewhat higher temperatures without loss in selectivity than is possible in the same system but lacking this water partial pressure.

The regenerator is operated at essentially the same pressure as the hydroforming reactor vessel and at temperatures of about 1000°–1200° F. or low enough to avoid any danger of thermally degrading the catalyst. The average residence time of the catalyst in the reactor is of the order of from about 1 to 4 hours and in the regenerator of from about 3 to 15 minutes. The average residence time of the heat transfer solids or shot in the reaction zone is of the order of from about 3 minutes to 20 minutes and in the regenerator it may be about 3 to 15 minutes, i. e., coextensive with the residence of the catalyst in the regenerator, or it may have a shorter residence time as when gas velocities through the regenerator are low enough and the regenerator itself is designed for segregation or more rapid settling of shot.

The weight ratio of catalyst to oil introduced into the reactor should ordinarily be about 0.5 to 3.5, although catalyst-to-oil ratios of 0.1 and less may be used with platinum catalysts. It is ordinarily preferable to operate at catalyst-to-oil ratios of about 1.0, since higher ratios tend to give higher or excessive carbon or coke formation. Somewhat higher ratios can be used at higher pressures.

Space velocities or the weight in pounds of feed charged per hour per pound of catalyst in reactor depends upon the age or activity level of the catalyst, the character of the feed stock, and the desired octane number of the product. Space velocity for a molybdic oxide on alumina gel catalyst may vary, for example, from about 1.5 w./hr./w. to about 0.15 w./hr./w.

The foregoing description contains a limited number of embodiments of the present invention. It will be understood, however, that this invention is not limited thereto, since numerous variations are possible without departing from the scope of this invention.

What is claimed is:

1. A method of carrying out endothermic reactions which comprises contacting vaporous reactants with a mixture of a major proportion of finely divided solid catalyst particles and a minor proportion of inert heat transfer solid particles of greater density and larger average particle size than said catalyst particles in a main reaction zone, continuously introducing catalyst, heat transfer solid particles and vaporous reactants to the main reaction zone, controlling the vapor velocities through said main reaction zone to form a dense, fluidized bed of solid particles and vaporous reactants in said reaction zone, continuously removing vaporous reaction products substantially free of solid particles overhead from said main reaction zone, continuously removing a mixture of catalyst particles and inert heat transfer solids from the lower part of the dense fluidized bed in said main reaction zone, moving the withdrawn mixture downwardly and laterally as a confined stream, introducing gas to said confined stream, passing said gas upwardly through said confined stream countercurrent to the solid particles so as to control the ratio of shot to catalyst in said confined stream by separating catalyst from inert particles, recycling the separated catalyst to the main reaction zone, through said confined stream transferring the high inert particles/catalyst ratio mixture formed by this treatment of the confined stream to a regeneration zone wherein the catalyst is regenerated and the inert particles are heated, and recycling hot particles and regenerated catalyst to the main reaction zone.

2. The method as defined in claim 1 in which the superficial velocity of the gas passing through the sloping conduit is varied to control the ratio of shot to catalyst in the confined stream.

3. The method as defined in claim 1 in which the density of the gas passing through the sloping conduit is varied to control the ratio of shot to catalyst in the confined stream.

4. The process as defined in claim 1 in which the gas admitted to the sloping conduit is admitted along the upper part of said conduit.

5. A method of hydroforming hydrocarbon fractions boiling within the motor fuel or naphtha range which comprises contacting vaporous hydrocarbons and hydrogen-rich gas with a mixture of a major proportion of finely divided solid hydroforming catalyst particles and a minor proportion of inert, heat transfer solid particles shot of greater density and larger average particle size than said hydroforming catalyst particles in a main reaction zone, continuously introducing hydroforming catalyst, shot and vaporous reactants to the main reaction zone, controlling vapor velocities through said main reaction zone to form a dense, fluidized bed of solid particles and vaporous reactants in said reaction zone, continuously removing vaporous reaction products substantially free of solid particles overhead from said main reaction zone, continuously removing a mixture of catalyst particles and shot from the lower part of the dense, fluidized bed in said main reaction zone, moving the withdrawn mixture downwardly and laterally as a confined stream through a sloping conduit, passing a high density gas upwardly through said confined stream so as to control the ratio of shot to catalyst in said confined stream by separating catalyst from shot, recycling the separated catalyst to the main reaction zone through said sloping conduit, transferring the high shot to catalyst ratio mixture formed by this treatment of the confined stream to a regeneration zone wherein the catalyst is regenerated and the shot is heated, and recycling the hot shot and regenerated catalyst to the main reaction zone.

6. The method as defined in claim 5 in which the density of the gas passing through the sloping conduit is varied to control the ratio of shot to catalyst in the confined stream.

7. The method as defined in claim 5 in which the gas supplied to said confined stream of shot and catalyst is a stabilizer overhead gas and the density of said gas is varied to control the ratio of shot to catalyst in the confined stream.

References Cited in the file of this patent
UNITED STATES PATENTS

| | | |
|---|---|---|
| 1,877,861 | Hatch | Sept. 20, 1932 |
| 2,393,636 | Johnson | Jan. 29, 1946 |
| 2,446,247 | Scheineman | Aug. 3, 1948 |
| 2,658,860 | Welty | Nov. 10, 1953 |
| 2,721,167 | Nicholson | Oct. 18, 1955 |
| 2,763,595 | Fritz | Sept. 18, 1956 |
| 2,763,597 | Martin et al. | Sept. 18, 1956 |